United States Patent [19]

Satran et al.

[11] Patent Number: 5,800,098
[45] Date of Patent: Sep. 1, 1998

[54] CUTTING TOOL ASSEMBLY

[75] Inventors: Amir Satran; Yaron Eizen, both of Kfar Vradim, Israel

[73] Assignee: Iscar Ltd., Migdal Tefen, Israel

[21] Appl. No.: 644,800

[22] Filed: May 10, 1996

[30] Foreign Application Priority Data

May 11, 1995 [IL] Israel ..................... 113698

[51] Int. Cl.⁶ ........................................ B23C 5/26
[52] U.S. Cl. ................... 407/31; 407/40; 407/47; 279/8; 408/224
[58] Field of Search .............. 407/31, 34, 30, 407/35, 33, 40, 43, 47, 48, 46, 51–56, 58, 59; 279/8; 408/224, 223, 231, 233

[56] References Cited

U.S. PATENT DOCUMENTS

| 1,495,067 | 5/1924  | Conklin        | 407/31 X |
| 2,844,947 | 7/1958  | Shipley .      |          |
| 2,969,250 | 1/1961  | Kull .         |          |
| 3,584,667 | 6/1971  | Reiland .      |          |
| 3,969,974 | 7/1976  | Lejdegard .    |          |
| 3,986,543 | 10/1976 | Slayton et al. | 407/31 X |
| 4,073,160 | 2/1978  | Perret .       |          |
| 4,361,412 | 11/1982 | Stolarczyk .   |          |
| 4,834,597 | 5/1989  | Anderson et al. . |      |
| 4,923,344 | 5/1990  | Bieri .        |          |
| 4,934,883 | 6/1990  | Anderson et al. . |      |
| 5,201,353 | 4/1993  | Weill          | 407/31 X |
| 5,207,132 | 5/1993  | Goss et al. .  |          |
| 5,551,811 | 9/1996  | Satran et al.  | 407/40   |

FOREIGN PATENT DOCUMENTS

| 2103071    | 12/1992 | Canada .              |
| 0 216 309  | 4/1987  | European Pat. Off. .  |
| WO 94/19132 | 1/1994 | WIPO .                |

OTHER PUBLICATIONS

*British Standard,* BS 122:Part 5:1978.
Search Report, Application No. 96107474.7 dated: Mar. 6, 1997.

*Primary Examiner*—A. L. Pitts
*Assistant Examiner*—Henry W. H. Tsai
*Attorney, Agent, or Firm*—Pennie & Edmonds LLP

[57] ABSTRACT

A tool assembly comprises first and second tool assembly units formed with interfitting male and female coupling members coaxially coupled together so as to have a common longitudinal axis, whereby a moment transmitted to the first unit is transmitted to the second unit. Each coupling member comprises a torque transmitting component having a central portion of a radial dimension defined by a radius of a circle inscribed therein and at least one arm extending from the central portion to periphery of the corresponding coupling member. The arms of the male and female coupling members have first side walls along which the coupling members generally contact and second side walls having a gap therebetween. The first walls are directed, at least at their contact regions, substantially radially with respect to the longitudinal axis. The second side wall of the at least one arm of at least the male coupling member is oriented so that a normal thereto drawn from the longitudinal axis is not shorter than the radius of the circle inscribed in the central portion of the male coupling member.

12 Claims, 4 Drawing Sheets

CUTTING TOOL ASSEMBLY

FIELD OF THE INVENTION

The present invention relates to a tool assembly comprising two or more components releasably coupled to one another. The invention particularly refers to a modular rotary cutting tool assembly in which components are coupled together in such a manner as to enable transfer of a rotary moment from one component to another.

BACKGROUND OF THE INVENTION

A typical rotary cutting tool assembly of the above kind comprises at least one cutting tool module and a tool holder and may also have an intermediate extension module therebetween. The tool holder has at its one end an adapter portion to which the cutting or the extension module is coupled and at another end an arbor or a shank adapted to be mounted on a machine tool drive spindle. The coupling between the assembly components has to be capable to transmit, during rotary machining operations, the torque from the tool holder to the module coupled thereto as well as from one module to another and has to be rigid enough to meet the reliability requirements of machining operations. Furthermore, the coupling must provide accurate mutual coaxial alignment of the components with respect to each other and with respect to a central rotary axis of the tool.

Known assemblies of the above kind are, for example, tenon drive systems as defined in British Standard BS 122: Part 5: 1978, in which components are coupled via mortise-and-tenon joints.

There are also known composite milling cutter assemblies such as disclosed in CA 2,103,071, where the coupling of a replaceable front end or intermediate component to a basic holder is achieved by means of pins which protrude from the component to engage with corresponding bores in the basic holder.

However, these assemblies are disadvantageous in view of their limited load transmission capability due to their small cross-sectional area of the torque-transmitting elements.

U.S. Pat. Nos. 4,834,597 and 4,934,883 disclose a cutting tool assembly for use with milling cutters and drilling tools, which comprises a cutting tool formed with a conical projection and a tool holder having a conical recess adapted to receive the projection. The cooperating surfaces of the recess and the projection have a non-circular cross-sectional shape so that the components of the assembly cannot rotate with respect to one another. The assembly further comprises means for clamping the members together. In this assembly, the contact between the conical cooperating surfaces may take place anywhere along the generators thereof, in consequence of which the actual regions of contact between the cooperating surfaces of the components and therefore the distribution of the clamping forces generated during machining operations cannot be exactly predetermined. Thus, in order to ensure a rigid coupling between the components, the length of contact between the components must be extended in an axial direction. However, with rotary milling cutters having flutes, the use of such an extended projection is very disadvantageous, seeing that the presence of such flutes essentially limits the space available for the projection to be accommodated. Furthermore, the production of such components with a relatively high precision which is most often required, seems to be rather expensive.

There is disclosed in WO 94/19132 a tool assembly for use with rotary cutting tools, which overcomes most of the above disadvantages. The assembly comprises first and second tool assembly components adapted to be coaxially coupled together so as to have a common longitudinal axis and so that a moment transmitted to the first component is transmitted to the second component. The components are formed with interfitting male and female coupling members each comprising torque transmitting arms extending generally radially with respect to the longitudinal axis and centering and alignment means, which all come to engagement upon axial clamping of the components one to another with clamping means. Each torque transmitting arm has a generally symmetrical shape and has side walls which are concavely curved so that a contact established between a pair of side walls of the arms of the male and female coupling members, upon their relative rotational displacement about the longitudinal axis, terminates adjacent terminal portions of the arms remote from the axis, the configuration of the arms being such that a pressure angle obtained at a point on contact line at which the contact between the side walls terminates, is essentially reduced as compared with pressure angles obtained in the known systems discussed above.

With the pressure angle being relatively small, load carrying capacity of the assembly can be essentially increased. In addition, by virtue of the specific geometry of the side walls of the torque transmitting arms, the contact between the coupling members takes place at such a predetermined area that a larger given rotary torque can be transmitted, whereby a relatively compact structure can be designed.

However, with the symmetrically designed torque transmitting arms having concave side walls, the lower the pressure angle, the more the side walls' convergence in the direction towards the longitudinal axis and, consequently, the weaker the arm structure.

It is therefore the object of the present invention to provide a tool assembly in which a torque transmission arrangement between components allows to obtain small pressure angles with the components' structure being substantially strengthened and, particularly, to provide a tool assembly having a compact and strong coupling arrangement which is especially advantageous for use with rotary cutting tools of small dimensions.

SUMMARY OF THE INVENTION

According to the present invention, there is provided a tool assembly comprising first and second tool assembly units formed with interfitting male and female coupling members adapted to be coaxially coupled together so as to have a common longitudinal axis, whereby a moment transmitted to the first unit is transmitted to the second unit;

each coupling member comprising a torque transmitting component having a central portion of a radial dimension defined by a radius of a circle inscribed therein and at least one arm extending from said central portion to periphery of the corresponding coupling member;

the arms of the male and female coupling members having first side walls along which the coupling members generally contact and second side walls having a gap therebetween, the first walls being directed, at least at their contact regions, substantially radially with respect to said longitudinal axis and the second side wall of said at least one arm of at least said male coupling member being oriented so that a normal thereto drawn from said longitudinal axis is not shorter than the radius of the circle inscribed in the central portion of the male coupling member.

Preferably, said second wall of each arm extends substantially tangentially with respect to the corresponding central portion, whereby said second wall blends smoothly with said central portion.

Thus, the first side wall of the torque transmitting arm of the male coupling member is directed substantially towards the longitudinal axis and the second side wall is directed substantially aside therefrom, strengthening thereby the arm's structure.

With the first side walls of the arms of the male and female coupling members being directed as above, the contact region established therebetween is oriented substantially radially, extending outwardly and terminating at a contact line remote from the longitudinal axis. An angle between a plane tangential to said contact region at a point on said contact line and a radial plane passing through said point and through the longitudinal axis is known as a pressure angle. Preferably, the first side walls are directed so that the pressure angle is substantially in the range −10° to +10°. It is still more preferable that the pressure angle equals 0°.

The first side walls of the arms, in particular in the contact region thereof, may be either planar or curved. When, in the contact region, the first side walls are co-planar or have the same curvature, applied loads can be distributed along a relatively large area.

In a preferred embodiment, the male coupling member has a centering projection in the form of a body of rotation adapted to be in a slip fit relationship with a corresponding centering bore formed in the female coupling member, whereby the coaxial alignment of the male and female coupling members is obtained.

In a preferred embodiment, each coupling member is formed with two oppositely disposed arms.

In a preferred embodiment, the tool assembly is a rotary assembly, with its common longitudinal axis also serving as a rotary axis, the tool units being coaxially coupled together so that a rotary moment transmitted to a first unit is transmitted therefrom to the second unit, the asymmetrically configured arms being oriented such as to conform to the direction of rotation of the tool assembly.

Thus, with the torque transmitting arms of the coupling members having an asymmetrical design according to the present invention, the pressure angle can be substantially close to 0°, enabling thereby maximal utilization of the reacted contact pressure force during torque transmission, for producing a tool assembly with a coupling arrangement having maximal load carrying capability. Where the torque to be transmitted is limited, this enables the design of a smaller, more compact coupling assembly which is specifically useful for modular tools of small diameters. On the other hand, employing a coupling assembly according to the present invention in a tool of fixed dimensions would allow to transmit a torque which is relatively high if compared with known coupling assemblies having generally the same dimensions.

BRIEF SUMMARY OF THE DRAWINGS

For a better understanding of the present invention, and to show how the same may be carried out in practice, reference will now be made to the accompanying drawings, in which.

DETAILED DESCRIPTION OF PREFERRED EMBODIMENT

Figure 1A:
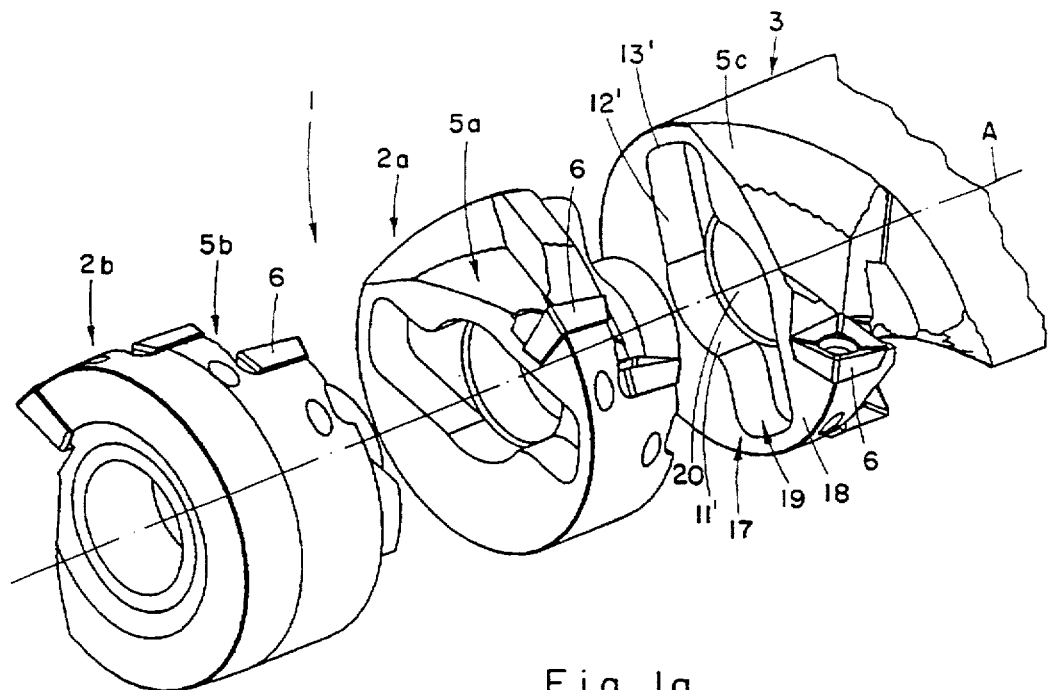
FIGS. 1a and 1b are exploded perspective views of a rotary milling tool assembly in accordance with the present invention.
Figure 1B:
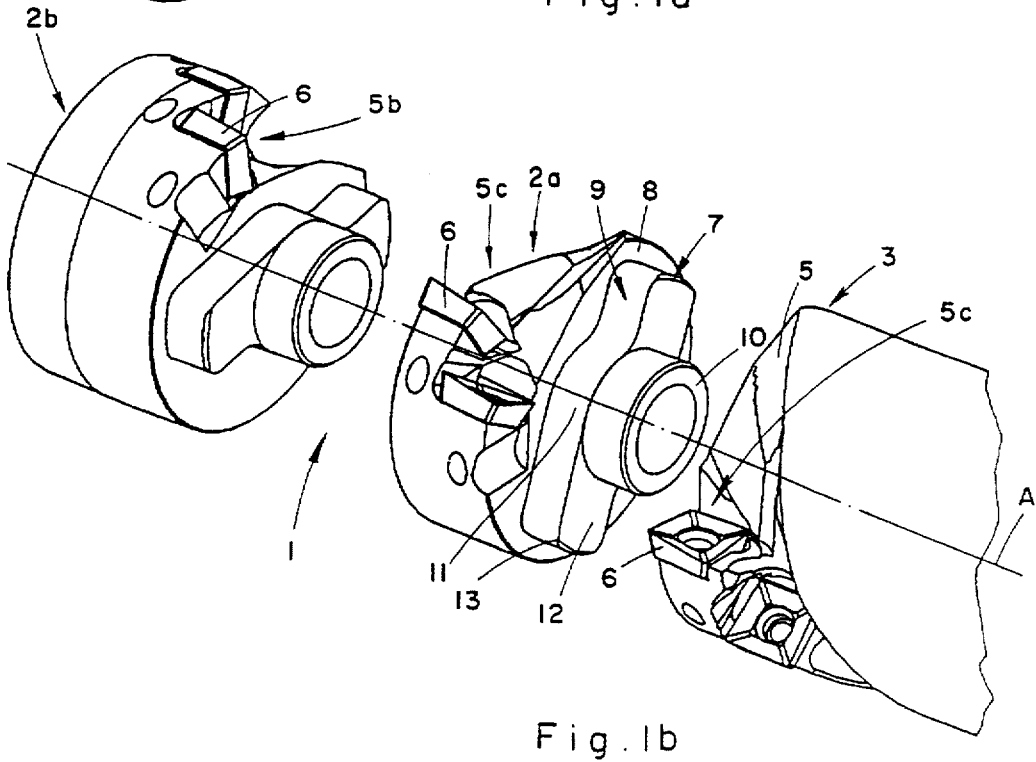
Figure 2:
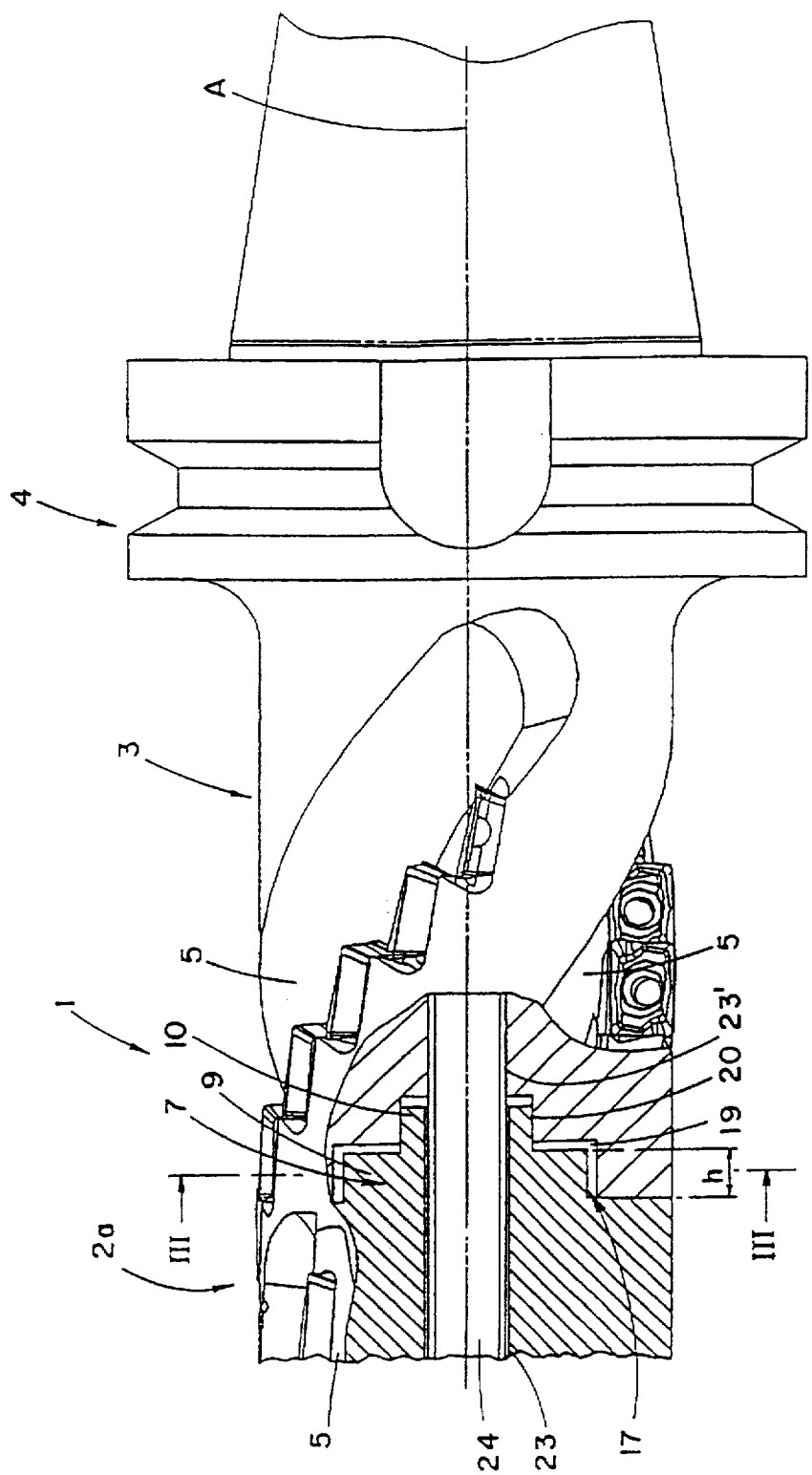
FIG. 2 is a partially sectioned side elevation view of the tool assembly shown in FIGS. 1a and 1b, when assembled, with an integrally formed tool holder shank.

FIGS. 1a, 1b and 2 of the drawings show a rotary milling cutter 1 having a longitudinal axis A and comprising modular milling cutter units 2a and 2b adapted for being coupled to each other and to a milling cutter adapter unit 3 formed at a leading end of a tool holder shank 4 adapted for being connected to a machine tool drive spindle (not shown).

As seen, the milling cutter units 2a, 2b and 3 are formed with helically-directed flute portions 5a, 5b and 5c which, when the units are coupled to each other, constitute a continuous extended helical flute 5. As seen in FIG. 2, the milling cutter has two extended flutes 5; however, for the simplification of illustration, in FIGS. 1a and 1b only one such flute is shown.

Each milling cutter unit 2a, 2b, 3 is formed, at the flute portion thereof, with insert receiving pockets carrying cutting inserts 6 which are successively disposed in a helix pattern so that, when the units are coupled to each other, the cutting inserts present a continuous peripherally extended cutting edge.

The front and intermediate milling cutter units 2b and 2a are coupled to each other in the same manner as the intermediate unit 2a is coupled to the adapter unit 3. In view of this, the arrangement of only the latter coupling will now be described.

As seen in FIGS. 1b and 2, the intermediate unit 2a has a male coupling member 7 projecting from a lower surface 8 thereof. The male coupling member 7 has a stepped configuration, comprising a male torque transmission component 9 and a cylindrical male centering component 10 projecting centrally therefrom. As seen, the male torque transmission component 9 has a central portion 11 and two oppositely disposed arms 12 merging with the central portion 11 and extending towards a terminal portion 13 thereof disposed at a periphery of the milling cutter unit 2a.

As seen in FIGS. 1a and 2 of the drawings, the adapter unit 3 is formed with a female coupling member 17 constituted by a recess in a front surface 18 of the unit 3, which recess corresponds in shape to the male coupling member 7 and is adapted to receive the latter. Thus, the recess comprises a female torque-transmitting component 19 and a cylindrical centering bore 20. The female component 19 has a central portion 11' and two oppositely disposed recessed arms 12' merging with the central portion 11' and extending towards a terminal portion 13' thereof disposed at a periphery of the adapter unit 3.

As seen in FIG. 2, the milling cutter units 2a and 3 are centrally and coaxially aligned by means of the cylindrical centering and alignment component 10 of the male coupling member 7 and the aligning bore 20 of the female coupling member 17. The milling cutter unit 2a has a centrally disposed bore 23 receiving a clamping bolt 24 (only a portion shown), the lower end of which is screw fitted into a correspondingly threaded bore 23' formed in the adapter unit 3.

Figure 3:
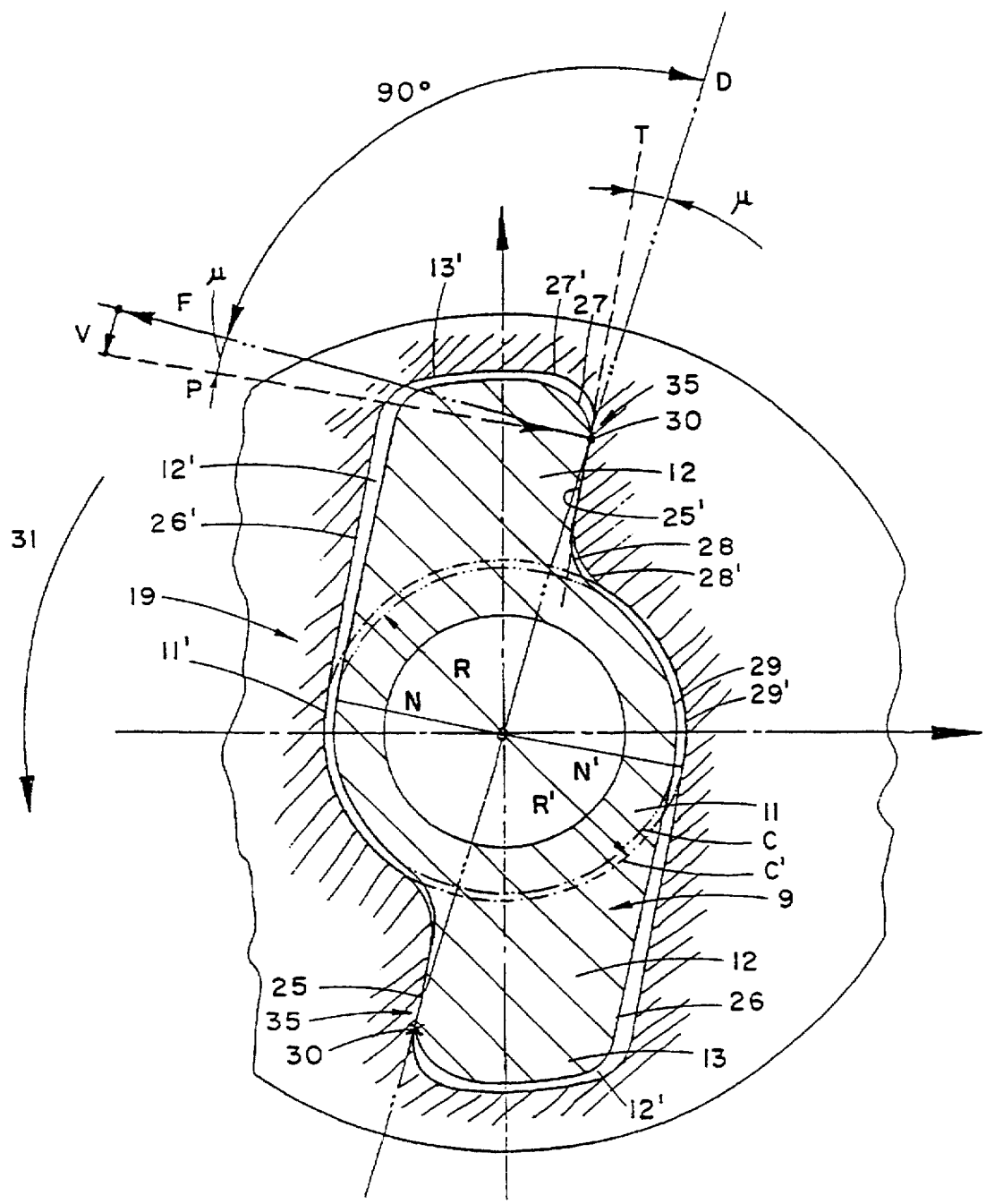
FIG. 3 is a cross-sectional view of the tool assembly shown in FIG. 2, taken along the line III:III.

FIG. 3 of the drawings illustrates cross-sectional shapes of the male and female coupling members 7 and 17 and the manner in which their arms 12 and 12' abut each other, when the milling cutter units 2a and 3 are firmly coupled together by means of the clamping bolt 24.

As seen, the central portion 11 of the male component 9 and the corresponding central portion 11' of the female component 19 are symmetrical with respect to the axis A. The central portions 11 and 11' have imaginary circles C and C' inscribed therein, with a common center on the axis A of the assembly.

The arms 12 of the male component 9 and recessed arms 12' of the female component 19 have an asymmetric shape in accordance with the direction of rotation of the tool assembly. Each arm 12 is asymmetric in that one cannot draw a radial line through the longitudinal axis which splits an arm into two halves which are mirror images of each other about the drawn radial line. The arms 12 and 12' are formed respectively with first side walls 25 and 25' along which the arms contact and second side walls 26 and 26' having a gap therebetween. As seen in FIG. 3, the first side walls 25 of the arms 12 of male coupling member 9 face in a direction substantially opposite to the direction of rotation 31 of the tool assembly. The gap is also provided between the terminal portions 13 and 13' of the arms.

The first side walls 25 and 25' are directed generally radially with respect to the longitudinal axis A and merge smoothly with the corresponding central portions 11 and 11' via concave transition portions 28 and 28'. The second side walls 26 and 26' are directed generally aside from the longitudinal axis A and merge with the concave transition portions 28, 28' via intermediate convex portions 29, 29' of the central portions 11 and 11'.

The second side walls 26 and 26' are disposed so that normals N and N' thereto drawn from the axis A are not shorter than the corresponding radii R and R' of the circles inscribed in the corresponding central portions 11 and 11'. Thereby, the second walls are substantially strengthened. Preferably, the second side walls are oriented substantially tangentially with respect to the corresponding inscribed circles C and C', which enables to avoid stress concentration at the transition zones.

As seen, the first and second side walls of the arms 12 and 12' merge with the corresponding terminal portions 13 and 13' thereof via arcuate corner portions. The corner portions 27 and 27' disposed adjacent the first side walls 25 and 25' have different radii so as to provide a clearance therebetween and to localize points 30 at which contact regions 35 between the first side walls 25 and 25' terminate.

The contact regions 35 of the first side walls 25 and 25' are substantially planar and lie in a plane T which defines with a diametric plane D passing through the axis A and through the points 30 at which the contact regions 35 terminate, a relatively low pressure angle μ. If now we consider the distribution of reaction forces, namely the pressure vector P which is normal to the plane T and passes through the point 30 and the force vector F normal to the diametrical plane D, it is clear that with the pressure angle μ being close to 0° the vectors F and P tend to coincide, thereby significantly reducing the non-contributing radial component V of the force and increasing the reacting turning torque which is defined by product of the force F and the distance between the point 30 and the axis A. Therefore, the pressure angle μ is preferably in the range −10° to +10° and still more preferably equals 0°.

It has been found that, with the pressure angle μ in such a range, the ability of the coupling to withstand the required applied force can be achieved even with a considerable reduction in the height h (see FIG. 2) of the arms 12 and 12'. Such a reduction is of course highly desirable when it is required to miniaturize the tool assembly. Thus, for example, to withstand the force F of the same magnitude, the conventional tenon drive system defined in BS 122: Part 5: 1978, having a centering bore of a standard diameter of 22 mm and defined by the pressure angle μ=16° needs the height of the arms h=6 mm, while a tool assembly which, according to the present invention, is defined by the pressure angle μ=6° and which has the alignment bore of the same diameter can have arms with the height h=4 mm. In addition, with the pressure angle μ=6°, the radial component V of the force is three times less than with the pressure angle μ=16°.

Furthermore, in addition to the provision of the reduced pressure angles μ, the construction in accordance with the invention ensures that the contact zones and, particularly, outermost extremities thereof are maximally remote from the axis of rotation, thereby effectively increasing the length of the moment arm, in consequence of which the transmitted torque is significantly increased.

Figure 4:
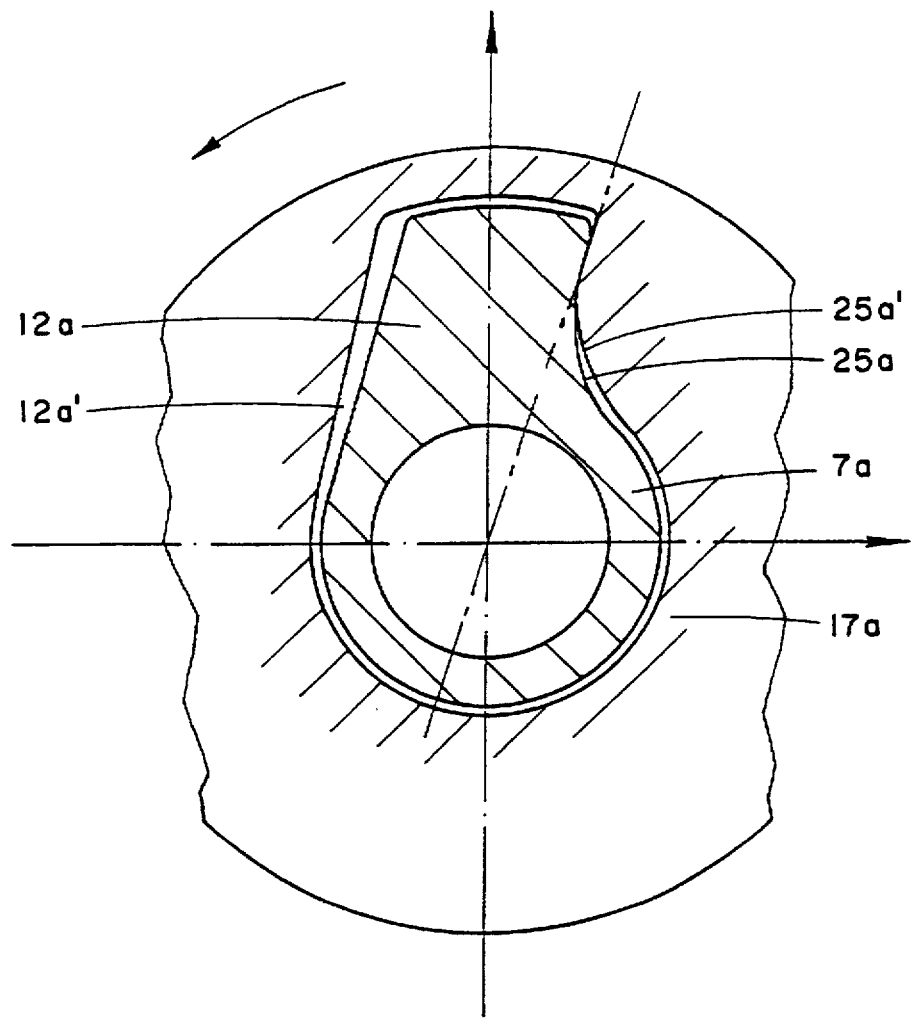
FIG. 4 illustrates an alternative embodiment of the tool assembly design as shown in FIG. 3.

Whilst in the arrangement shown in FIGS. 1a, 1b, 2 and 3 of the drawings the male and female coupling members are shown as having two arms, it will be appreciated that the invention is equally applicable to a situation where the mating torque transmission components are provided with other numbers of arms, i.e. more than two arms or a single arm as shown in FIG. 4, the latter being specifically suitable for a rotary tool of extremely small dimensions.

Furthermore, whilst in the arrangement specifically described the first side walls 25 and 25' of the male and female coupling members are substantially planar, at least at the contact regions thereof, there exists a possibility that one or both contacting first side walls 25 and 25' are continuously curved, having either the same or different radii of curvature. Thus, FIG. 4 shows male and female coupling members 7a and 17a with curved first side walls 25a and 25a' of torque transmitting arms 12a and 12a', one side wall nesting within the other.

Whilst the described central portions 11 and 11' are shown as cylindrical, they may, in fact, have any other configuration suitable for the purpose of the present invention.

Whilst in the specific illustrated example the tool assembly is shown as being provided with helically-directed flutes, the invention is equally applicable to assemblies wherein such flutes are not provided. Similarly, the invention is also applicable where the tool assembly is stationary and is, for example, used in turning operations.

The provision of the centering and aligning component which projects from the torque transmission component has, as the name indicates, specific centering and aligning purposes. It will be appreciated, however, that under certain circumstances this component can be dispensed with and aligning can be effected by means of a clamping bolt having a precisely manufactured shoulder portion and by means of mating precise bores formed in respective units to be coupled and coaxial with the alignment axis thereof.

It will furthermore be appreciated that the invention is equally applicable to rotary or stationary tool assemblies having non-cylindrical cutting profiles, i.e. where modular milling cutter units having a cutting profile of any shape are coupled to a tool holder of any conventional type.

Finally, whilst the invention has been specifically described for use with a two-component cutting assembly, the invention is equally applicable where more modular units have to be coaxially coupled, for example, in order to extend the length of the cutting assembly where this may be required. In each case, each unit can be provided with torque-transmitting coupling means substantially similar to those described above with respect to the tool component system.

Claims:

1. A tool assembly comprising first and second tool assembly units formed with interfitting male and female coupling members adapted to be coaxially coupled together so as to have a common longitudinal axis, whereby a moment transmitted to the first unit is transmitted to the second unit;

each coupling member comprising a torque transmitting component having a central portion of a radial dimension defined by a radius of a circle inscribed therein and at least one arm extending from said central portion to a periphery of the corresponding coupling member;

the arms of the male and female coupling members being formed with first and second side walls, the first side walls each having a contact region along which the coupling members generally contact, and being directed, at least at said contact region, substantially radially with respect to said longitudinal axis, and the second side walls having a gap therebetween;

wherein the second side wall of said at least one arm of the male coupling member is oriented so that a distance between said second side wall and said longitudinal axis is not shorter than the radius of the circle inscribed in the central portion of the male coupling member.

2. A tool assembly according to claim 1, wherein the second side wall of said arm extends substantially tangentially with respect to the corresponding central portion.

3. A tool assembly according to claim 1, wherein said first side walls are directed so that a pressure angle defined between a plane tangential to said contact region at a radially outermost point thereof, and a radial plane passing through said point and through the longitudinal axis, is substantially in the range of −10° to +10°.

4. A tool assembly according to claim 1, wherein said contact region of said first side walls is planar.

5. A tool assembly according to claim 4, wherein said contact region of the first side walls is co-planar with a radial plane passing through said longitudinal axis, whereby said pressure angle equals 0°.

6. A tool assembly according to claim 1, wherein at least one of said first side walls is continuously curved.

7. A tool assembly according to claim 6, wherein both said first side walls are continuously curved and have, at said contact region, substantially the same radius of curvature.

8. A tool assembly according to claim 1, wherein the male coupling member has a centering projection in the form of a body of rotation adapted to be in a slip fit relationship with a corresponding centering bore formed in the female coupling member, whereby the coaxial alignment of the male and female coupling members is obtained.

9. A tool assembly according to claim 1, wherein each coupling member is formed with two oppositely disposed arms.

10. A tool assembly according to claim 1, wherein the tool assembly is a rotary assembly, with its common longitudinal axis also serving as a rotary axis, the tool units being coaxially coupled together so that a rotary moment transmitted to a first unit is transmitted therefrom to the second unit, each arm having an asymmetric shape about a radial line passing therethrough.

11. A tool assembly according to claim 10, wherein said first side wall of said at least one arm of the male coupling member faces in a direction substantially opposite to a direction of rotation of the tool assembly.

12. A tool assembly according to claim 1, wherein the tool assembly is a rotary assembly, with its common longitudinal axis also serving as a rotary axis, the tool units being coaxially coupled together so that a rotary moment transmitted to a first unit is transmitted therefrom to the second unit, the arms being oriented such that said first side wall of said at least one arm of the male coupling member faces in a direction substantially opposite to a direction of rotation of the tool assembly.

* * * * *